US010083515B2

(12) United States Patent
Ostrovsky-Berman et al.

(10) Patent No.: US 10,083,515 B2
(45) Date of Patent: Sep. 25, 2018

(54) METHOD AND SYSTEM FOR SEGMENTING MEDICAL IMAGING DATA ACCORDING TO A SKELETAL ATLAS

(75) Inventors: Yaron Ostrovsky-Berman, Petach-Tikva (IL); Tiferet Ahavah Gazit, Tel-Aviv (IL)

(73) Assignee: Algotec Systems Ltd., RaAnana (IL)

( * ) Notice: Subject to any disclaimer, the term of this patent is extended or adjusted under 35 U.S.C. 154(b) by 1057 days.

(21) Appl. No.: 12/624,519

(22) Filed: Nov. 24, 2009

(65) Prior Publication Data

US 2010/0128954 A1 May 27, 2010

Related U.S. Application Data

(60) Provisional application No. 61/117,586, filed on Nov. 25, 2008.

(51) Int. Cl.
*G06K 9/00* (2006.01)
*G06T 7/11* (2017.01)
*G06T 7/187* (2017.01)

(52) U.S. Cl.
CPC .............. *G06T 7/11* (2017.01); *G06T 7/187* (2017.01); *G06T 2207/20128* (2013.01); *G06T 2207/30008* (2013.01); *G06T 2207/30101* (2013.01)

(58) Field of Classification Search
CPC ............ G06T 2207/10081; G06T 2207/20128
See application file for complete search history.

(56) References Cited

U.S. PATENT DOCUMENTS

| | | | |
|---|---|---|---|
| 7,123,760 B2 * | 10/2006 | Mullick | G06T 5/50 382/131 |
| 7,397,475 B2 * | 7/2008 | Shen et al. | 345/420 |
| 7,747,050 B2 | 6/2010 | Lau et al. | |
| 8,094,906 B2 * | 1/2012 | Porat | G06T 7/187 382/128 |
| 8,121,362 B2 | 2/2012 | Zhan et al. | |
| 8,660,635 B2 * | 2/2014 | Simon | G06F 19/3481 600/424 |
| 2002/0168110 A1 | 11/2002 | Al-Kofahi et al. | |

(Continued)

FOREIGN PATENT DOCUMENTS

| WO | WO 2008/062415 | * | 5/2008 | ............ G06T 17/40 |
|---|---|---|---|---|
| WO | WO-2008062415 A2 | * | 5/2008 | ........... G06T 7/0012 |

OTHER PUBLICATIONS

Betke, M., et al. "Landmark detection in the chest and registration of lung surfaces with an application to nodule registration." Medical Image Analysis. 7(2003) p. 265-281.*

(Continued)

*Primary Examiner* — Robert A Sorey
*Assistant Examiner* — Kristine K Rapillo

(57) ABSTRACT

A method for segmenting a medical image. The method comprises providing a registration of a medical image depicting a plurality of bones with a skeletal atlas mapping an exemplary skeletal structure having a plurality of exemplary bones, identifying at least one component having at least one anatomical characteristic indicative of a predefined organ in the medical image, each the at least one component depicting at least one of the plurality of bones, and segmenting at least one region of interest (ROI) around the at least one component within the medical image according to at least one respective the exemplary bone pertaining to the predefined organ.

27 Claims, 9 Drawing Sheets

(56) References Cited

U.S. PATENT DOCUMENTS

| | | | |
|---|---|---|---|
| 2003/0053697 | A1 | 3/2003 | Aylward et al. |
| 2005/0110791 | A1 | 5/2005 | Krishnamoorthy et al. |
| 2005/0259856 | A1 | 11/2005 | Dehmeshki |
| 2006/0239553 | A1 | 10/2006 | Florin et al. |
| 2007/0002046 | A1 | 1/2007 | Tanacs et al. |
| 2007/0053589 | A1 | 3/2007 | Gering |
| 2007/0276214 | A1* | 11/2007 | Dachille ............... G06T 7/0012 600/407 |
| 2009/0028403 | A1* | 1/2009 | Bar-Aviv .............. G06F 19/321 382/128 |
| 2010/0172567 | A1 | 7/2010 | Prokoski |

OTHER PUBLICATIONS

Official Action dated Jun. 25, 2012 From the US Patent and Trademark Office Re. U.S. Appl. No. 12/624,505.
Response dated Jun. 15, 2011 to European Search Report and the European Search Opinion dated Nov. 17, 2010 From the European Patent Office Re. Application No. 09176874.7.
European Search Report and the European Search Opinion dated Apr. 28, 2010 From the European Patent Office Re.: Application No. 09176878.8.
Fripp et al. "Automatic Segmentation of the Bones From MR Images of the Knee", 4th IEEE International Symposium on Biomedical Imaging: From Nano to Macro, XP031084279, p. 336-339, Apr. 1, 2007. p. 337, L-h Col., Last § - r-h Col., Figs. 1, 2, 5, Abstract, Section 4.
Park et al. "Construction of an Abdominal Probalistic Atlas and Its Application in Segmentation", IEEE Transactions on Medical Imaging, XP011076452, 22(4): 483-492, Apr. 1, 2003. p. 483-484, 487.
Pham et al. "Current Methods in Medical Image Segmentation", Annual Review of Biomedical Engineering, XP009062827, 2: 315-337, Aug. 1, 2000.
Straka et al. "Bone Segmentation in CT-Angiography Data Using a Probalistic Atlas", Proceedings of International Workshop on Vision, Modeling and Visualization, XP002359576, p. 505-512, Jan. 1, 2003. Section 6, Fig.7.
Communication Pursuant to Article 94(3) EPC dated Apr. 26, 2013 From the European Patent Office Re.: Application No. 09176878.8.
European Search Report and the European Search Opinion dated Apr. 15, 2013 From the European Patent Office Re. Application No. 13156248.0.
Official Action dated Feb. 26, 2013 From the US Patent and Trademark Office Re. U.S. Appl. No. 12/624,505.
Gong et al. "Anatomical Object Recognition and Labeling by Atlas-Based Focused Non-Rigid Registration and Region-Growing", International Conference on Audio, Language and Image Processing, ICALIP 2008, XP031298555, p. 1354-1358, Jul. 7, 2008.
Nain et al. "Vessel Segmentation Using a Shape Driven Flow", Field Programmable Logic and Application, XP055059594, 3216: 51-59, Sep. 26, 2004. Abstract.
Communication Pursuant to Article 94(3) EPC dated Feb. 21, 2011 From the European Patent Office Re. Application No. 09176878.8.
Bookstein "Prinicpal Warps: Thin-Plate Splines and the Decomposition of Deformations", IEEE Transactions on Pattern Analysis and Machine Intelligence, 11(6): 567-585, Jun. 1989.
Cootes et al. "Active Shape Models—Their Training and Application", Computer Vision and Image Understanding, 61(1): 38-59, Jan. 1995.
Posada et al. "Towards a Noninvasive Intracranial Tumor Irradiation Using 3D Optical Imaging and Multimodal Data Registration", International Journal of Biomedical Imaging, 2007: 1-14, 2007.
Yeo et al. "Effects of Registration Regularization and Atlas Sharpness on Segmentation Accuracy", MICCAI 2007, Part I, LNCS 4791: 683-691, 2007.
Communication Pursuant to Rule 69 EPC—Reminder Concerning Payment of the Designation Fee (Art. 79(2) EPC) and of the Examination Fee (Art. 94(1) EPC) —and Invitation Pursuant to Rule 70a(1) EPC dated Jun. 14, 2010 From the European Patent Office Re. Application No. 09176878.8.
Response dated Aug. 30, 2011 to Communication Pursuant to Article 94(3) EPC of Feb. 21, 2011 From the European Patent Office Re. Application No. 09176878.8.
Invitation Pursuant to Article 94(3) and Rule 71(1) EPC dated Oct. 27, 2011 From the European Patent Office Re. Application No. 09176878.8.
European Search Report and the European Search Opinion dated Nov. 17, 2010 From the European Patent Office Re. Application No. 09176874.7.
Response dated Dec. 8, 2010 to Communication Pursuant to Rule 69 EPC—Reminder Concerning Payment of the Designation Fee (Art. 79(2) EPC) and of the Examination Fee (Art. 94(1) EPC)—and Invitation Pursuant to Rule 70a(1) EPC of Jun. 14, 2010 From the European Patent Office Re. Application No. 09176878.8.
Benameur et al. "3D/2D Registration and Segmentation of Scoliotic Vertebrae Using Statistical Models", Computerized Medical Imaging and Graphics, XP002322203, 27(5): 321-337, Sep. 1, 2003. Abstract, p. 322, Last §-1-h Col., Section 3., 7., Figs.4, 10, 11.
Haas et al. "Automatic Segmentation of Thoracic and Pelvic CT Images for Radiotherapy Planning Using Implicit Anatomic Knowledge and Organ-Specific Segmentation Strategies", Physics in Medicine and Biology, XP002606162, 53(6): 1751-1771, Mar. 21, 2008. Abstract, Sections 2, 5, Table 1.
Van de Giessen et al. "Constrained Registration of Multiple Rigid Objects in Close Proximity: Application in the Wrist Joint", 4th IEEE International Symposium on Biomedical Imaging: From Nano to Macro, ISBI 2007, XP031084371, p. 704-707, Apr. 1, 2007. Abstract, Section 2, Figs.2, 3, Section 4.
Van Straten et al. "Removal of Bone in CT Angiography of the Cervical Arteries by Piecewise Matched Mask Bone Elimination", Medical Physics, XP012075063, 31(10): 2924-2933, Oct. 1, 2004. Abstract, Section 2.
Official Action dated Jun. 12, 2014 From the US Patent and Trademark Office Re. U.S. Appl. No. 12/624,505.
Communication Pursuant to Article 94(3) EPC dated Oct. 27, 2015 From the European Patent Office Re. Application No. 13156248.0.

\* cited by examiner

METHOD AND SYSTEM FOR SEGMENTING MEDICAL IMAGING DATA ACCORDING TO A SKELETAL ATLAS

RELATED APPLICATION

This application claims the benefit of priority of U.S. Provisional Patent Application No. 61/117,586 filed on Nov. 25, 2008.

This application is also being co-filed with a U.S. patent application by Yaron Ostrovsky-Berman, entitled METHOD AND SYSTEM FOR REGISTERING A MEDICAL IMAGE Ser. No. 12/624,505, which claims the benefit of priority of U.S. Provisional Patent Application No. 61/117,585 filed Nov. 25, 2008.

The contents of the above applications are incorporated by reference as if fully set forth herein.

FIELD AND BACKGROUND OF THE INVENTION

The present invention, in some embodiments thereof, relates to a system and a method for segmenting medical imaging data, such as computed tomography (CT) images and, more particularly, but not exclusively, to a system and a method for using a binary atlas of the human skeleton for segmenting medical imaging data.

Medical images are images of a human subject that are analyzed for the purposes of biological and medical research, diagnosing and treating disease, injury and birth defects. Commonly, medical images involve modalities that are able to capture data that allows imaging internal organs and tissues in a non-invasive manner. Examples of such modalities include computed tomography (CT), magnetic resonance imaging (MRI), positron emission tomography (PET), ultrasound, fluoroscopy, conventional x-rays, and the like. Medical images may be analogue or digital, two-dimensional or three-dimensional; however, three-dimensional modalities are digital.

When medical images are taken for diagnosis they are usually meticulously inspected by computer aided diagnosis (CAD) systems and/or trained medical practitioners, for example radiologists, to detect instances of abnormality that may be indicative of diseases. Additionally, the medical images may be used to accurately locate lesions so that treatments such as chemotherapy and radiotherapy may be precisely delivered and surgery may be effectively planned.

As medical images are usually three or four dimensional, the practitioner may step through a sequence of two-dimensional image slices at regular intervals, inspecting each slice. Thus, inspection of medical images may be tedious and prone to error. Accordingly, methods of computer aided detection (CAD) have been developed for the automatic location, registration, and segmentation. CAD may also be used to locate, characterize and segment anatomical structures.

Segmentation may be performed according to local properties of bones and/or tissues. For example, International Patent Application No. WO/2006/097911 describes a method of automatically identifying bone components in a medical image dataset of voxels, the method comprising: a) applying a first set of one or more tests to accept voxels as belonging to seeds, wherein none of the tests examine an extent to which the image radiodensity has a local maximum at or near a voxel and falls steeply going away from the local maximum in both directions along an axis; b) applying a second set of one or more tests to accept seeds as bone seeds, at least one of the tests requiring at least one voxel belonging to the seed to have a local maximum in image radiodensity at or near said voxel, with the image radiodensity falling sufficiently steeply in both directions along at least one axis; and c) expanding the bone seeds into bone components by progressively identifying candidate bone voxels, adjacent to the bone seeds or to other previously identified bone voxels, as bone voxels, responsive to predetermined criteria which distinguish bone voxels from voxels of other body tissue.

SUMMARY OF THE INVENTION

According to some embodiments of the present invention there is provided a method for segmenting a medical image. The method comprises providing a registration of a medical image depicting a plurality of bones with a skeletal atlas mapping an exemplary skeletal structure having a plurality of exemplary bones, identifying at least one component having at least one anatomical characteristic indicative of a predefined organ in the medical image, each the at least one component depicting at least one of the plurality of bones, and segmenting at least one region of interest (ROI) around the at least one component within the medical image according to at least one respective the exemplary bone pertaining to the predefined organ.

Optionally, the predefined organ is selected from a group consisting of a lower limb, sternum, the pelvis, the spine, the scapulae, and the ribs.

Optionally, the registration is used to transform the predefined organ and the at least one anatomical characteristic into the ROI.

Optionally, the method further comprises filling surface discontinuities in the ROI.

Optionally, the method further comprises dilating the at least one component according to at least one anatomical characteristic of neighboring voxels in the medical image and classifying the at least one dilated component, the dilating continuing according to the classification.

More optionally, the classifying is performed according to at least one of the shape of the at least one dilated component and the radiodensity variance of the at least one dilated component.

More optionally, the classifying is performed according to at least one of the shape of the at least one dilated component and the radiodensity variance of the at least one dilated component.

Optionally, the method further comprises classifying at least one vascular sub component in the at least one component as at least one vessel before the segmenting, the segmenting comprising removing the at least one vascular sub component from the at least one component.

More optionally, the method further comprises dilating at least one sub component in the at least one component.

More optionally, the classifying is performed according to the radiodensity variance of the at least one dilated sub component.

Optionally, the method further comprises dilating at least one sub component in the at least one component by a marching process and classifying the at least one dilated sub component according to a shape of a wave front of the at least one dilated sub component, the dilating continuing according to the classification.

Optionally, the at least one voxel of at least one sub component of the component is tagged within the ROI according to an intensity of at least one anatomical characteristic pertaining thereto, the segmenting being performed according to the tagging.

Optionally, the dilating is performed in an iterative boundary expansion process, the direction of the dilating continuing according to the shape of the at least one dilated component during the iterative boundary expansion process.

Optionally, the predefined organ is the spine, and the identifying comprises classification of a voxel as either vertebrae or aorta according to at least one member of the following group: a mean voxel intensity value, a voxel intensity radiodensity variance, a gradient magnitude, a second derivative of the radiodensity, a box interior mean, a box interior radiodensity variance, a box boundary mean, and a box boundary radiodensity variance.

Optionally, the at least one voxel of the at least one component is tagged by identifying a first sub component having at least one characteristic indicative of a bone marrow in the medical image and a second sub component encircling the first sub component and removing the first sub component, and the segmenting being performed according to the tagging.

Optionally, the predefined organ is the sternum, the at least one anatomical characteristic being at least one of the estimated location of the lungs and a layer of air in front of the at least one component.

Optionally, the medical image data comprises a member of a group consisting of a computed tomography (CT) medical image, a positron emission tomography (PET), a magnetic resonance imaging (MRI), a PET-CT image, and a single photon emission computed tomography (SPECT) image.

According to some embodiments of the present invention there is provided an apparatus for segmenting a medical image. The apparatus comprises an input interface configured for receiving a medical image depicting a plurality of bones, the medical image being registered with a skeletal atlas mapping an exemplary skeletal structure having a plurality of exemplary bones and a segmentation module configured for segmenting at least one region of interest (ROI) around at least one component having at least one anatomical characteristic indicative of a predefined organ in the medical image, each the at least one component depicting at least one of the plurality of bones. The segmenting is performed according to at least one respective the exemplary bone pertaining to the predefined organ.

Optionally, apparatus is a picture archiving and communication system (PACS) workstation.

Optionally, the output of the segmentation module is used to visualize the medical image with bones of at least one of variable opacity and color.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
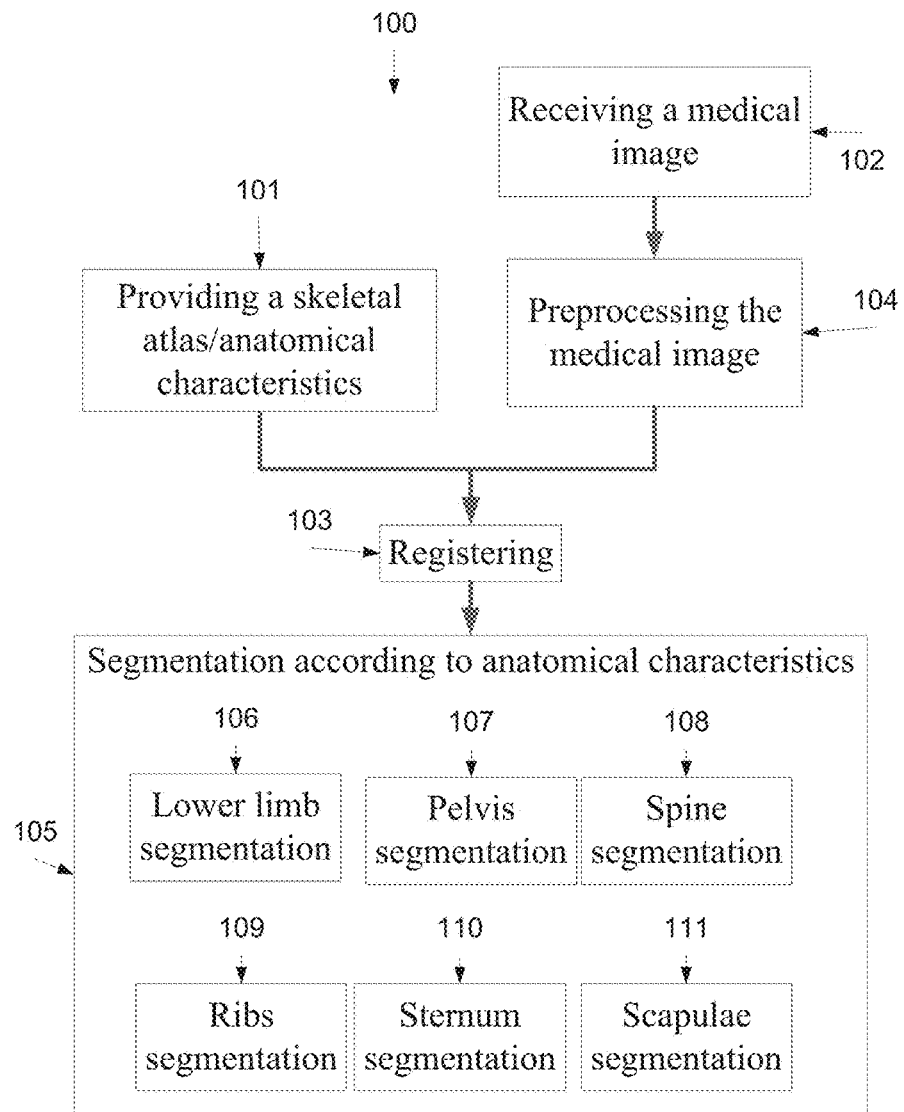
FIG. 1 is a flowchart of a method for segmenting a medical image according to a registration thereof to a skeletal atlas, according to some embodiments of the present invention.

DESCRIPTION OF SPECIFIC EMBODIMENTS
OF THE INVENTION

The present invention, in some embodiments thereof, relates to a system and a method for segmenting medical imaging data, such as CT images and, more particularly, but not exclusively, to a system and a method for using a binary atlas of the human skeleton for segmenting medical imaging data.

According to some embodiments of the present invention, there is provided a method and an apparatus for segmenting bones and/or organs in a medical image of a bone structure according to skeletal atlas of a respective bone structure. The method and/or apparatus allow segmenting and removing bones in vessel visualization processes, such as direct volume rendering on the basis of compositing, maximum-intensity projection, and rendering of boundary-structures like iso-surfaces, are just the most important techniques to be mentioned here. The method and apparatus may further allow the segmentation of images stored in medical image databases, such as PACS, for example as described below.

The method may be based on a registration of a medical image depicting a plurality of bones with a skeletal atlas mapping an exemplary skeletal structure having a plurality of exemplary bones. The registration allows identifying one or more components having predefined anatomical characteristics which are indicative of a predefined organ in the registered medical image. Each one of the components depicts one or more of the bones in the medical image. The method further comprises segmenting the one or more components according to one or more respective exemplary bones in the skeletal atlas pertaining to the predefined organ.

According to some embodiments of the present invention, there is provided a method for segmenting a blood vessel, such an artery. The method is based on processing a medical image, such as a CT angiography, depicting one or more vessels in a proximity to one or more bones, identifying one or more vessel components having vascular characteristics and dilating the vessel components according to vascular characteristics of neighboring voxels documented in the medical image and/or a shape of said the vessel component. The component is dilated according to radiodensity variance of the dilated vessel component and/or a wave front of the dilated vessel component. In such a manner, the vessel component may be segmented, for example as further described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method 100 for segmenting a medical image according to a registration thereof to one or more maps and/or models of a human skeleton and/or a segment thereof, referred to herein as a skeletal atlas, according to some embodiments of the present invention. The registration produces a mapping between organs depicted in the skeletal atlas and organs depicted in the medical image. As used herein, a medical image means a dataset that is generated using one or more of the following techniques computed tomography (CT) study, positron emission tomography (PET), PET-CT, and single photon emission computed tomography (SPECT).

The segmentation of the medical image may be used for displaying images of organs and/or tissues which are extracted from the medical image, for example as a preparation for a volume rendering of images based on the medical image and/or during the visualizing of the extracted organs and/or tissues, for example as a preparation for a maximum intensity projection (MIP). Any visualization and/or presentation methods, for example in CT angiography, may also be based on the outputs of the segmentation method 100. The segmentation may be performed by one or more computing units, each comprising one or more central processing unit (CPU) cores.

First, as shown at 101, a skeletal atlas is provided. The skeletal atlas may be created in advance and hosted in a repository. In some embodiments of the present invention, the atlas is created as described in co-filed application by Yaron Ostrovsky-Berman, entitled method and system for registering medical imaging data, which the content thereof is incorporated by reference as if fully set forth herein and which may referred to herein as the co-filed application. Optionally, the repository is a local memory device. Optionally, the repository is a remote storage device, such as a network node, for example a server and/or any other memory device that is accessible via a communication network, such as the internet.

As shown at 102, a medical image is received, either directly from a medical imaging system and/or indirectly via a content source such as an archiving communication system (PACS) server, a PACS workstation, a computer network, or a portable memory device such as a DVD, a CD, a memory card, etc.

Optionally, as shown at 103, the medical image is registered according to the received skeletal atlas, for example as described in the co-filed application. The registration superimposes the medical image onto the skeletal atlas in a manner that allows mapping bones which are depicted in the medical image. In such a manner, different regions of interest (ROIs) may be defined around specific bones and/or organs, such as the legs, feet, the spine, the pelvis, the ribs, the sternum, the scapulae and/or a combination thereof. The ROI allows the segmentation of these bones and/or organs as further described below. For clarity, the registration may map additional structures, such as the central curve of the spine. It should be noted that as the medical image has higher resolution than the atlas masks and as the skeletal atlas masks may be based on a shorter and/or thinner one or more persons than the medical image, stretching artifacts are part of any ROI produced from the skeletal atlas. Since each voxel in the medical image is mapped to a respective voxel in the skeletal atlas, the registration is bound to holes and discontinuities in the ROI. Therefore, one or more dilations of the ROI mask are optionally performed to close them.

Optionally, as shown at 104 and before and/or after the registration, the medical image may be preprocessed. The preprocessing may include down-sampling for further processing at a lower resolution. For example, the medical image may be reduced to a resolution such as isotropic 3 millimeter per pixel (MMP), 6 MMP, and 15 MMP. The preprocessing may include identifying and segmenting an ROI that encompasses the body of the patient imaged in the medical image, for example using the registration and manipulation method that is described in international patent application publication number WO/2008/062415 filed on Nov. 22, 2007, which is incorporated herein by reference. The registration and manipulation method allows removing and/or otherwise separating objects which are not part of depicted human body, such as a scanner bed, tubes, medical devices and wires, from the imaged tissues in the medical image.

Now as shown at 105, a plurality of organs, which are depicted in the medical image, are segmented according to the skeletal atlas registration. The segmentation of different organs may be performed sequentially and/or simultaneously.

As shown at 106, the lower limb bones are segmented. Optionally, the core of the lower limbs bones is identified according to the Hounsfield unit (HU) value of the voxels in the medical image.

Figure 2:
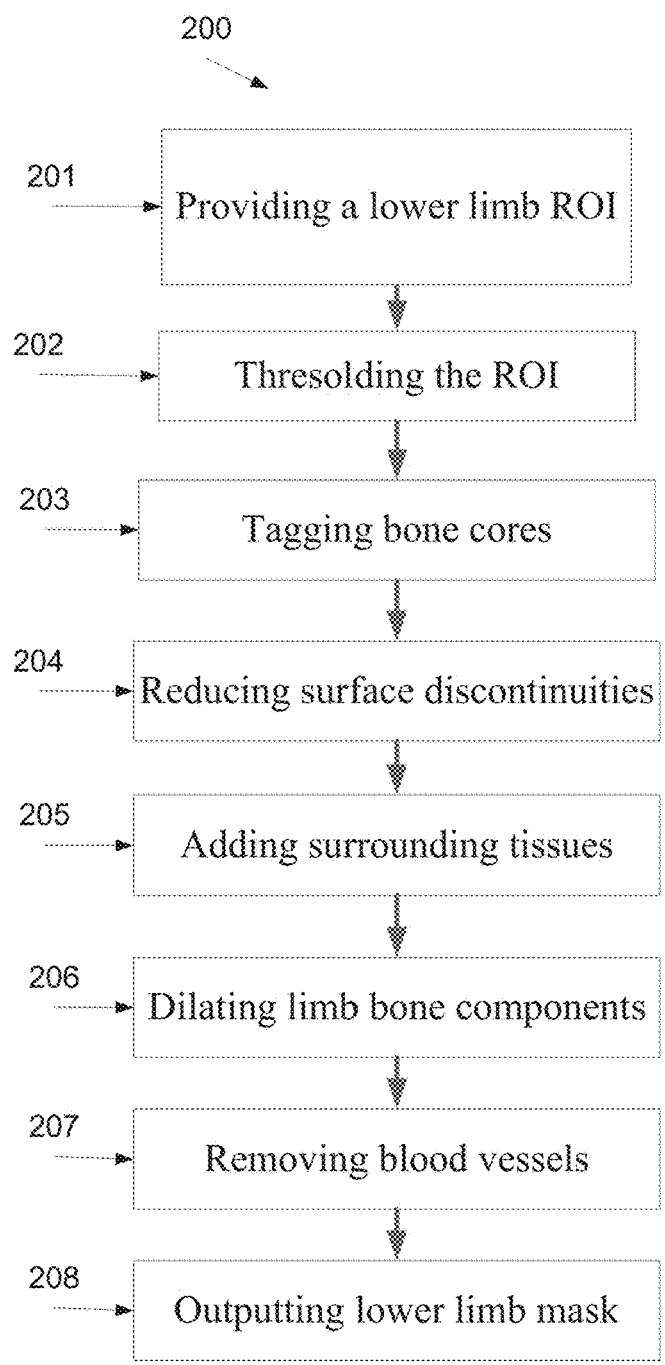
FIG. 2 is a flowchart of a method for segmenting lower limb bones, according to some embodiments of the present invention.

Reference is now made to FIG. 2, which is a flowchart of a method 200 for segmenting lower limb bones, according to some embodiments of the present invention. For clarity, a lower limb means a leg bone and/or a foot bone. First, as shown at 201, a lower limb ROI of consecutive slices of the medical image that depicts the lower limbs or a portion thereof is identified and extracted, optionally as described in the co-filed application. Then, as shown at 202, the scans in the extracted lower limb ROI are thresholded according to a HU value to produce a binary version of the lower limb ROI that depicts high-radiodensity components and may be referred to herein as a lower limb bone mask. Optionally, the HU value is 900 HU, the voxels are tagged are as potential lower limb bone core voxels.

Now, as shown at 203, the high-radiodensity components are tagged as lower limb bone cores of potential lower limb bone components. In particular, if voxels of the lower limb bone core create a component having a wraparound substantially equal to an expected wraparound of a lower limb bone core, for example a vertical, tubular component having a length substantially equal to expected length of a lower limb bone core, the respective potential lower limb bone components is tagged as a lower limb bone component.

Now, after the high-radiodensity components are tagged, the surrounding of the body may be masked out, for example using the method that is described in international patent application publication number WO/2008/062415 filed on Nov. 22, 2007, which is incorporated herein by reference, optionally as described in the co filed application. Optionally, everything that lies below a bone intensity threshold, such as 200 HU, is masked out. Masking out the outside of the body prevents the detection of foreign objects as lower limb bones.

Now, as shown at 204, surface discontinuities in each one of the lower limb bone cores in the lower limb bone mask are filled. The tagged lower limb bone cores may have a non-homogeneous structure due to the inhomogeneity of the bone core depicted in the medical image. Such a structure has surface discontinuities such as cracks, holes and fissures. Optionally, these surface discontinuities are closed by applying a morphological filter, such as connectivity-dilation filter. Optionally, the connectivity-dilation filter, with an HU threshold value of 550 HU, is consecutively applied n times to create a connectivity binary mask, optionally as long as the distance from the initial core is more than 5 millimeter (mm). The applying of such a morphological filter fills the surface discontinuities on the wraparound of high-density components of the binary version. In such a manner, surface discontinuities such as cracks and cavities in the trabecular bone tissue are closed. Cavities containing the trabecular bone inside the core are closed with a morphological operation that fills the components that are disconnected from the outside of the binary image.

Now, as shown at 205, surrounding tissues are added to each one of the lower limb bone components. For example, voxels that depict a number of tissues in the proximity of the component, such as voxels affected by the partial volume effect, are added to the lower limb bone components, for example by using a two stage connectivity-closing filter. In the first stage, the addition of partial volume may be performed by applying a morphological filter, such as a connectivity-dilation filter, with an HU threshold value of 150 HU, to create a binary connectivity mask. In the second stage, voxels added during the first stage and connected to the lower limb bone mask from the outside are removed by a connectivity-erosion filter. In such a manner, voxels that depict vessels which are tangent to the bone are removed from the lower limb bone mask. It should be noted that voxels of organs such as joints, for example hips, knees, and ankles, are not added to the components. The output mask of the above operations is referred to hereafter as the lower limb bone core, or simply the bone core.

Now, as shown at 206, the skeletal atlas is used for dilating each one of the lower limb bone components to include tissues of the lower limb bone that surround or are proximal to the bone core, for example hips, knees, and ankles. Optionally, the skeletal atlas is warped into the space of the medical image and the borders of the bone component are adjusted according to the borders of a respective lower limb bone from the skeletal atlas. In some embodiments of the present invention, voxels having an HU value above a certain threshold, for example 150 HU, and positioned in a predefined location in relation to the bone component, for example below the ankle, are added to the bone component. In such a manner, feet vessels may be added to the bone component.

Figure 3:
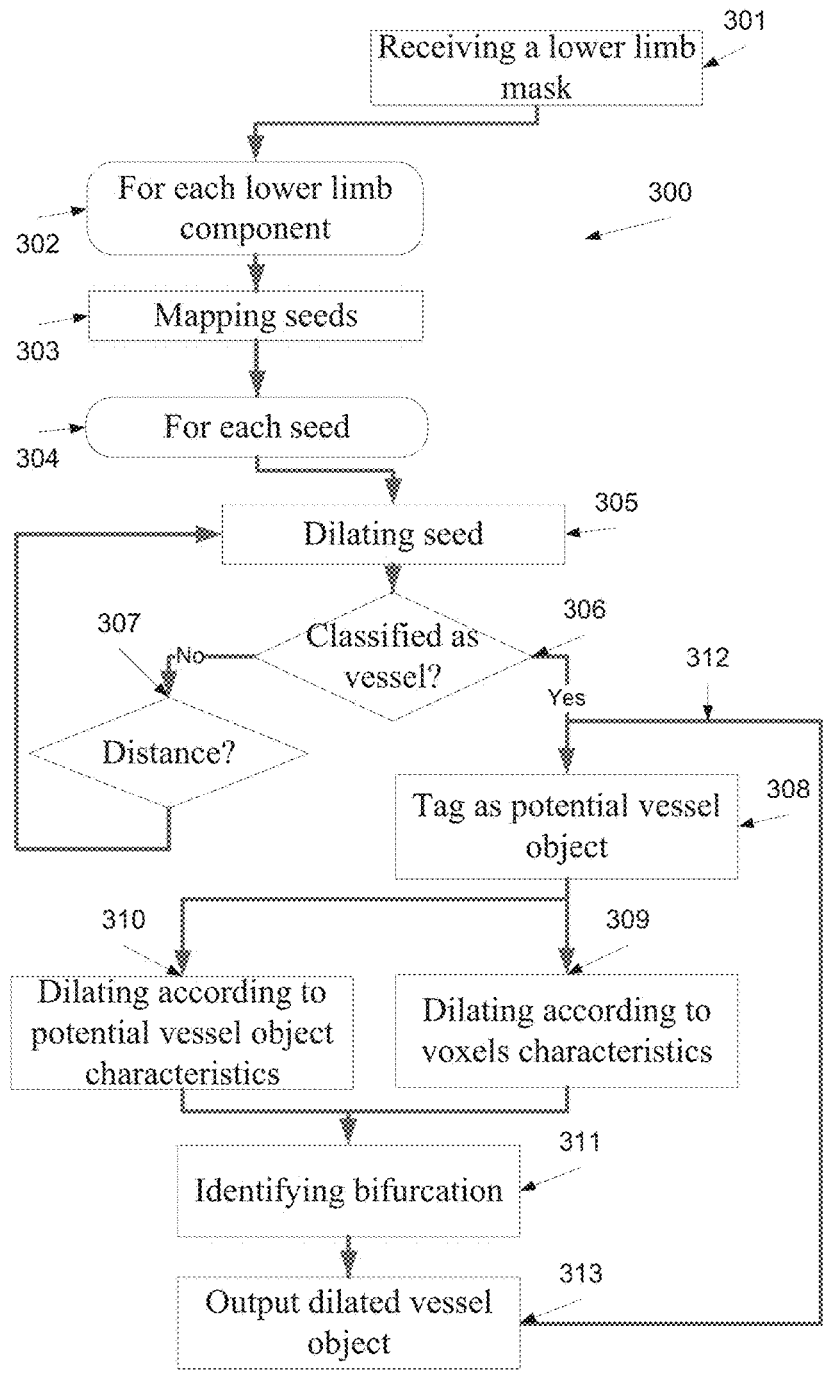
FIG. 3 is a schematic illustration of a vessel segmentation process, according to some embodiments of the present invention.

Now, as shown at 207, blood vessels, such as arteries which are adjacent to the segmented lower limb bone or relatively close thereto, for example the feet arteries, are removed from the lower limb bone component in order to correct the lower limb bone mask. Optionally, the vessels are segmented and than removed from the lower limb ROI which may be referred to herein as a lower limb mask. Reference is now also made to FIG. 3, which is a schematic illustration of a vessel segmentation process 300, according to some embodiments of the present invention.

First, as shown at 301, an image of the lower limbs from the medical image is received. Optionally, the image is the lower limb mask and the bone core that is generated in 201-207. The lower limb mask includes a dilated version of the lower limb components. As shown at 302, the process from hereon is performed for each one of the lower limb components depicted in the lower limb bone mask.

As shown at 303, each voxel of the wraparound of the lower limb bone component in the received lower limb mask is mapped into a list of candidate vessel seeds. Each member of the list is marked as a seed for a component growth algorithm. As described in relation to numerals 305-308, the component growth algorithm starts with a single seed which expands into neighboring voxels until being classified. As shown at 304, each seed is dilated, according to the dilation algorithm, with neighboring voxels having HU value above a predefined threshold, such as 150 HU. As shown at 305-307 the dilation is repeated in a plurality of dilation iterations as long as the dilated seed, which is referred to herein as a potential vessel object, is not classified and/or extends beyond a predefined distance from the seed's center. The classification is optionally performed according to a vascular characteristic, such as an expected vascular shape and/or an expected vascular voxel radiodensity variance, for example:

1. A ball-shaped component is classified as a non-vessel. Such a ball-shaped component may be identified by a principal component analysis (PCA), see Digital Image Processing, second ed. R. C. Gonzalez and R. E. Woods. Chapter 11.4 (ISBN 0-201-11026-1), which is incorporated herein by reference. As described in this reference, the PCA produces three values of the variance along principal axes of the component shape. The largest of these values corresponds to the long axis. The ball-shaped components have roughly equal variance along all axes, meaning there is no long axis.
2. A thin, straight, tubular component is classified as a vessel. Such a component may be identified by the aforementioned PCA, where a large variance value and two smaller values of similar size are expected.
3. A low variance in the shell volumes is classified as a curved vessel. The volume of a shell is the number of voxels added in a single dilation. The shell volumes are analyzed for variance as well as absolute values to accept or reject the component as a vessel.
4. A component whose convex hull is sheet-shaped and having a relatively good fit to a planar curve, optionally according to a least squares fit, is classified as curved vessel. Such a component may be identified by the aforementioned PCA, where two large variance values and one small value are expected. In such a manner, two large axes which define a potential planar curve are measured. If the fit error of this measurement is relativity large, the component is classified as a non-vessel.

Optionally, in order to reduce the computational complexity of the process, voxels belonging to the first k dilation iterations are marked and/or removed from the list. In addition, voxels classified as non-vessels may also be marked and/or removed from the list.

Now, as shown at 308, in order to complete the segmentation of the entire vessel, every dilated object that is classified as vessel is marked as a potential vessel object, which may be referred to herein as vascular component, for expansion. Optionally, as soon as a seed is classified as a potential vessel object, it is immediately expanded. As used herein, an expansion also means an expansion of a balloon expansion process, an iterative boundary expansion process, and/or any wave equation expansion process.

Optionally, the expansion is performed according to a long-range balloon expansion algorithm during which the potential vessel object is expanded. Optionally, the balloon expansion algorithm is based on a Fast Marching platform process, see J. A. Sethian—Level sets methods and Fast Marching methods: evolving interfaces in computational geometry, fluid mechanics, computer vision, and material sciences. Cambridge University Press, 1999, which is incorporated herein by reference.

As shown at 309, the progress of the expansion may be directed according to characteristics of voxels which the dilated vessel potential vessel object may be expanded to during the marching process. Optionally, a local cost is calculated for each voxel which the dilated potential vessel object may be expanded to during the expansion progress. The local cost of each voxel may depend on the following characteristics:
1. A voxel intensity—a characteristic learned from the vessel segment tagged at 308. Optionally the voxel intensity is a histogram of HU value probabilities.
2. A repulsion zone relevancy—in order to avoid tagging a bone segment as a vessel segment, voxels tagged as having anatomical characteristics, such as high radiodensity, for example the lower limb bone core voxels in block 202 are marked as members of a repulsion zone and receive a high local cost.
3. A gradient magnitude—while a high gradient marks the edge of the bone a low gradient marks the vessel's center. The gradient magnitude threshold is updated during expansion.

The expansion of the dilated potential vessel object during the marching process is directed and/or limited by local progress coefficients which are associated with voxels it may be expanded to. During the matching, the local progress coefficient propagates from a first voxel to a second voxel according to the local cost that is defined for the second voxel. While a high local cost decreases the local progress coefficient that is given to the second voxel, a low local cost increases it.

The local progress coefficient reflects the momentum of the expansion along a path starting from the seed and ending at the voxel that receives it. As such, the amplification of the local progress coefficient accelerates the progress in a certain direction and the reduction of the local progress coefficient decelerates it.

As voxels in areas defined as repulsion zone receives a high local cost, the expansion of the dilated potential vessel object into bone area is reduced. In such a manner, the repulsion zone slows the expansion towards the bone segment and prevents leakage into the leg bone component. For example, medical image taken in a CT angiography procedure usually depicts tibial arteries as connected to the tibia bone. As such, the repulsion zone may be marked to cover the entire bone at the point of contact with the vessel and therefore may include some of the vessel. In such a manner, the repulsion zone slows down a dilated potential vessel object that expands with a relatively high local progress coefficient from an area of a vessel. The slowing down allows the dilated potential vessel object to cross over to sections of the tibial arteries via the repulsion zone. Paths that lead further into the bone partial volume are completely stopped due to the length of the passage in the repulsion zone.

As shown at 310, the progress and/or vector of the expansion may be limited or directed according to characteristics of the dilated potential vessel object, for example according to its shape and/or size of the wave front thereof. Optionally, a global progress coefficient is defined for the dilated potential vessel object according to the outcome of a current expansion evaluation. Optionally, when the time of arrival becomes final for a certain voxel during a marching process, it is inserted into a cache of recent voxels. Every k expansion iterations, optionally 10, 20, 30, 50, 100, 150, 200 and 250 the content of the recent voxels is inspected as a wave front of the dilated potential vessel object expansion. The properties of the wave front guide the direction of the dilated potential vessel object expansion. Optionally, the wave front is examined during expansion evaluation for identifying a vessel-like shape according to the aforementioned. While a vessel shape increases the global progress coefficient, a non-vessel shape signifies a leakage of the expansion into one or more adjacent bones and triggers a retraction of the expansion to reduce and/or remove the leakage from the segmentation and/or the termination of the expansion process. Optionally, upon discovery of the leakage, the dilated potential vessel object is separated from the voxels of the bone component, for example using a slice by slice local gradient-based segmentation algorithm that finds the curve the separates the bone from the vessel. For instance, the side of the bone may be marked as an excluded region and the expansion continues at the point before the leak, avoiding the excluded region.

Now, as shown at 311, vessel bifurcations which are characterized by two disconnected fronts are identified, optionally according to a connected component analysis. Upon discovery of a bifurcation, the expansion proceeds in two separate directions, each may be referred to herein as branches. As depicted in 312, each one of the branches may be expanded as a separate dilated potential vessel object and further expands as described in relation to 308-310 above.

Now, as shown at 313, the dilated potential vessel object is outputted as a segmented vessel. The process depicted in 305-312 may be repeated to any vessel seed that is detected in proximity to the borders of the bone component.

Figure 4:
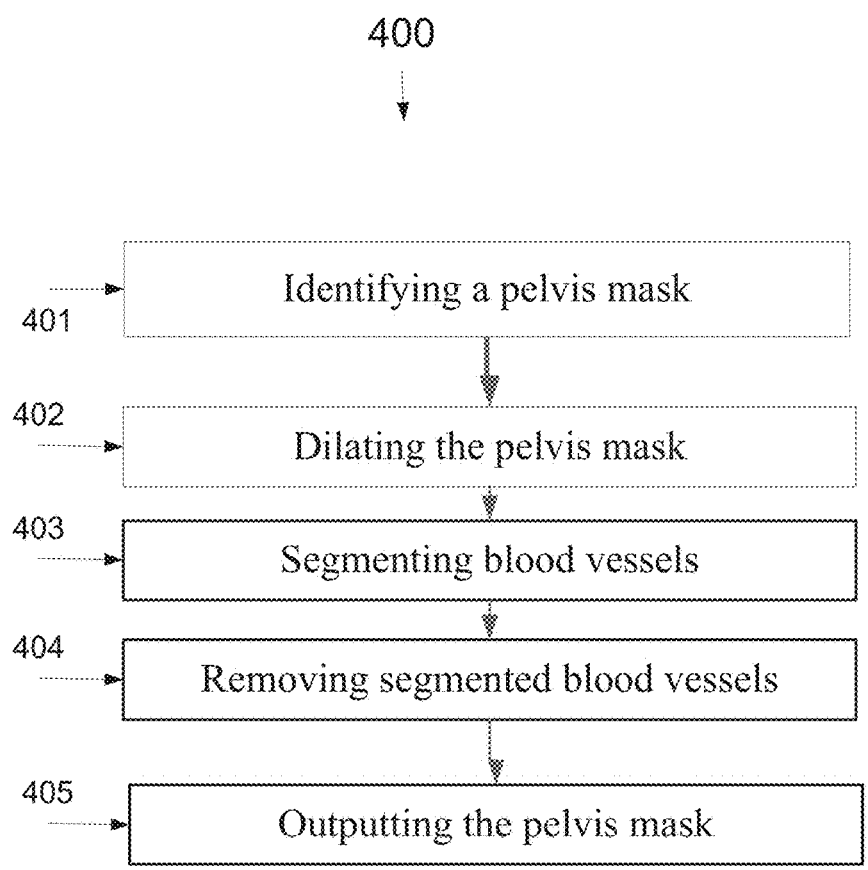
FIG. 4, which is a flowchart of a method for segmenting the pelvis according to a skeletal atlas, according to some embodiments of the present invention.

Reference is now made once again to FIG. 2. As depicted in 207 and described above, the segmented vessels are removed from the segmented lower limb bone component in the lower limb bone mask. Now, as shown at 208, a lower limb mask that allows the segmentation of the lower limbs is outputted Reference is now made once again to FIG. 1. As shown at 105, the medical image is segmented according to the atlas. As shown at 107, the pelvis is segmented. Reference is also made to FIG. 4, which is a flowchart of a method 400 for segmenting the pelvis according to a skeletal atlas, according to some embodiments of the present invention. First, as shown at 401, a pelvis mask is identified according to the received skeletal atlas. Optionally, the registration of the medical image onto the skeletal atlas allows the extraction of a pelvis mask, for example as described in the co-filed application. Then, as shown at 402, the pelvis mask is dilated with a connectivity-dilation algorithm. Optionally, the dilation is performed, mutandis mutatis, according to the process described in blocks 203-205 of FIG. 2. In such a manner, misregistrations may be corrected. It should be noted that the mask may include blood vessels, such as iliac and gluteal arteries. Then, as shown at 403, blood vessels in a proximity to the registered pelvis are segmented. The vessel segmentation is similar to the process described in relation to 207 and FIG. 3. Optionally, no repulsion zone is tagged during and/or before the vessel segmentation. Now, as shown at 404, the segmented vessels are removed. As shown at 405, the pelvis mask may now be outputted to allow the segmentation of the pelvis.

Reference is now made once again to FIG. 1. As shown at 105, the medical image is segmented according to the atlas. As shown at 108, the spine is segmented.

Figure 5:
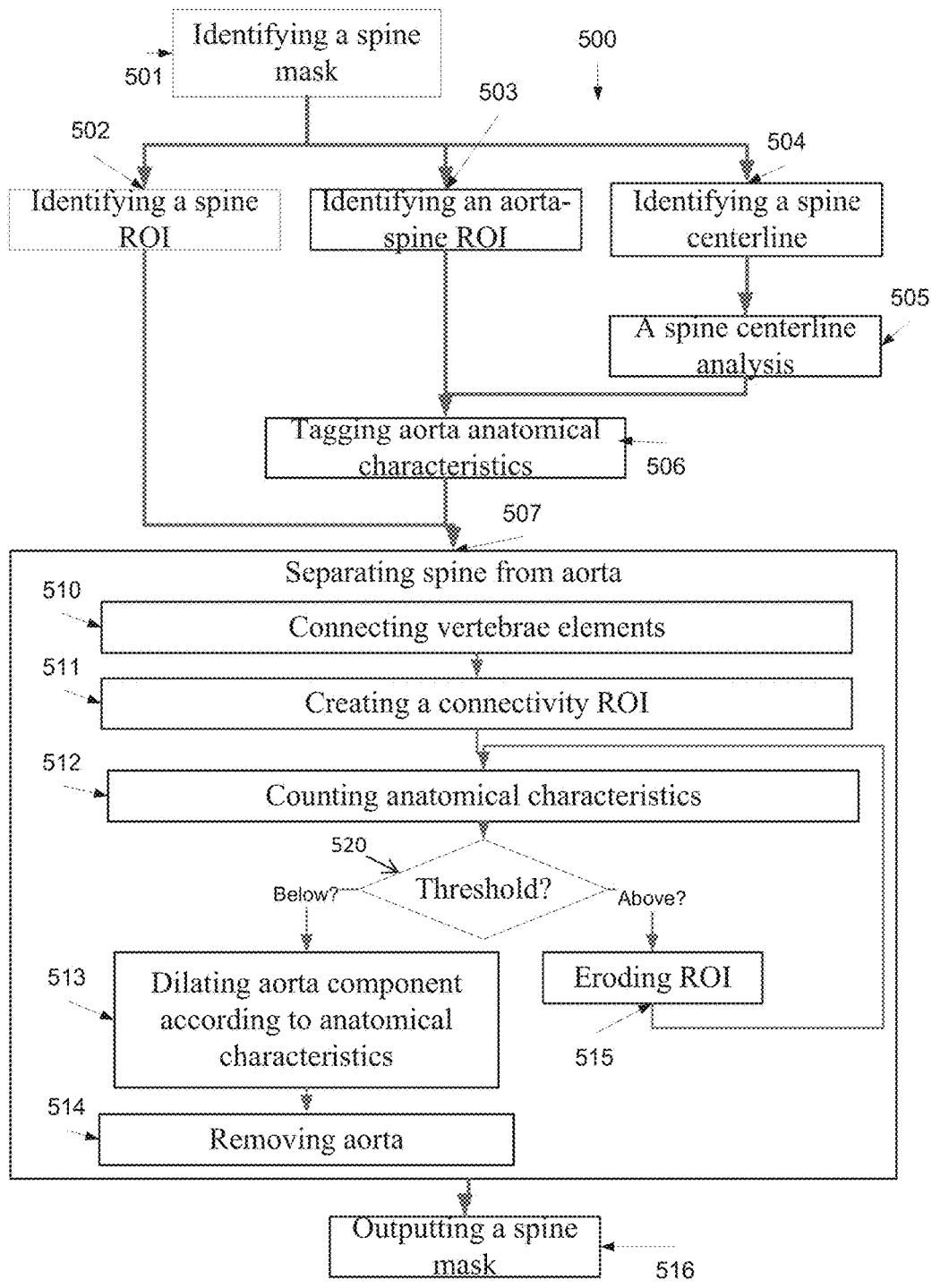
FIG. 5 is a flowchart of a method for segmenting the spine according to a skeletal atlas, according to some embodiments of the present invention.

Reference is also made to FIG. 5, which is a flowchart of a method 500 for segmenting the spine according to a skeletal atlas, according to some embodiments of the present invention. As commonly known, the spinal vertebrae are proximal to the aorta and the iliac arteries. These arteries occasionally appear connected to the spine in medical images, such as angiography CT images. The segmentation of the spine allows disconnecting the aorta and the iliac arteries from the spine.

First, shown at 501, a spine mask is identified according to the received skeletal atlas. Optionally, the registration of the medical image onto the skeletal atlas allows the extraction of the spine mask, see co-filed application.

As shown at 502 and 503, two regions of interest (ROI) in the spine mask are mapped onto the skeletal atlas according to a spine transformation. The first ROI, which may be referred to as the spine ROI, 502 encircles the spine and includes the vertebrae of the spine and a relatively thick shell around the spinous processes, for example approximately 20 mm in width. This ROI accounts for mis-registration of the spine. The second ROI, which may be referred to herein as the aorta-spine ROI, 503 surrounds the junction between the spine and the bifurcation of the aorta and the right iliac arteries.

As shown at 504, a spine centerline is identified and tagged. Optionally, the skeletal atlas includes a set of anatomical characteristics, which may be referred to herein as spine characteristics, which have been marked, optionally manually, along the centers of the exemplary vertebrae, for example as described in the co-filed application. These anatomical characteristics are superimposed into the study's space, and linearly connected to form a thin centerline.

Now, as shown at 505, the centerline is analyzed. A set of features that characterizes the vertebrae are learned from a cube-shaped local neighborhood area which encircles the centerline. Optionally, the set of features includes:
  a mean voxel radiodensity value;
  a voxel radiodensity variance;
  a gradient magnitude;
  a second derivative of the centerline;
  an interior box mean;
  an interior box radiodensity variance;
  a box boundary mean; and
  a box boundary radiodensity variance.

For clarity, as used herein the set of features refers to a cubical structure that defines a neighborhood of the voxels. The cubical structure comprises an interior box comprising the interior voxels of the cubical structure and a box boundary that comprises voxels at the boundary of the cubical structure. Optionally, the box boundary is more than 1 voxel wide, for example 2, 3, 4, 5, and 10 voxels. Statistics are collected for both regions of the cubical structure, referred to herein as a cube, and for a union thereof. It is expected that cubes centered inside the aorta, the intensity mean and variance of voxels in the box boundary is similar or smaller than that of the voxels in interior box. Conversely, for cubes centered inside a vertebra's marrow, the mean and variance of the intensity on the boundary is larger than that of the interior, due to the proximity of the vertebra cortex.

Now, after the set of features is extracted and the junction between the spine and the bifurcation of the aorta and the right iliac arteries is covered by a ROI, as shown at 503 and 504, aorta vascular characteristics are identified, as shown at 506. Aorta vascular characteristics are searched for among a subset of elements sampled from the aorta-spine ROI, herein referred to as candidate aorta elements. The features listed above are computed around each candidate aorta element. A candidate aorta element is tagged as an aorta vascular characteristic if it has a low gradient, a low radiodensity variance, a high mean intensity, and a low absolute value of the second derivative. Otherwise it is not tagged. Optionally, the classification of each anatomical characteristic candidate aorta element is determined according to the distance thereof from the spine centerline. In particular, in the majority of the population, the aorta passes substantially in front of the spine. Therefore, the further a candidate aorta element, which is located substantially at the front of the centerline, from the centerline, the more likely it is to be an aorta vascular characteristic.

Optionally, the classification of each candidate aorta element is based on an exemplary set of vertebrae properties learned during the centerline analysis. If the properties of a candidate aorta element are similar to vertebrae properties, the element is not tagged as an aorta vascular characteristic.

Now, as shown at 507, the spine is separated from the aorta, for example according to a morphological process. First, as shown at 510, the vertebrae in the spine ROI are connected, for example by dilating the spine centerline. Then, as shown at 511, connectivity ROI that encircles a union of anatomical characteristics from the two ROIs is created. Now, as shown at 512, the number of anatomical characteristics which are tagged as aorta vascular characteristics and connected to the dilated centerline is counted. As shown at 513, if the number of anatomical characteristics which have not been counted is above a predefined threshold, for example as shown at 520, optionally zero, then the perimeter of the connectivity ROI is eroded, as shown at 515, and the loop continues. Such a computation is optionally performed in a number of repetitive iterations as long as a stopping criterion is met, for example when a predefined threshold is met and/or a predefined number of iterations have been performed. In such a manner, the erosion is successfully disconnecting the spine from the aorta, allowing the segmentation of the aorta, as shown in 513. The aorta component may be dilated by a number of iterations, optionally respective to the number of iterations performed for eroding the entire connectivity mask. In such a manner, the aorta component grows back to its original volume without the holes. The aorta component can now be removed from the spine mask, as shown in 514.

As described above, the spine ROI may include remaining components from the aorta that are disconnected from the spine. Optionally, the spine ROI is regrown by connectivity to the dilated spine centerline. As shown at 516, the regrown spine ROI is used for outputting a spine mask that allows the segmentation of the spine.

Figure 6:
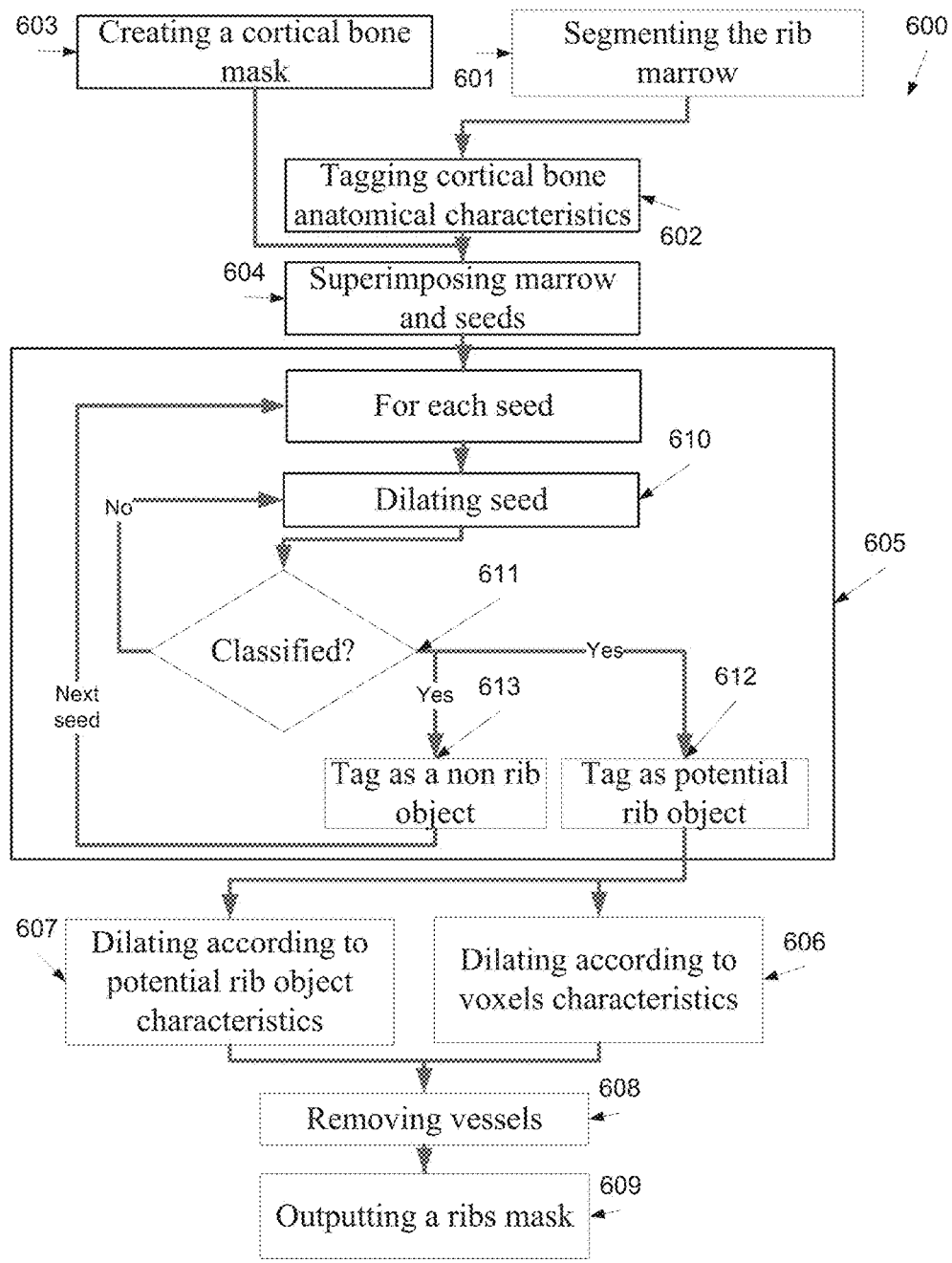
FIG. 6 is a flowchart of a method for segmenting the ribs according to a skeletal atlas, according to some embodiments of the present invention.

Reference is now made once again to FIG. 1. As shown at 105, the medical image is segmented according to the atlas. As shown at 109, the ribs are segmented. Reference is also made to FIG. 6, which is a flowchart of a method 600 for segmenting the ribs according to a skeletal atlas, according to some embodiments of the present invention.

First, as shown at 601, the rib marrow is segmented. Optionally, the segmentation of the rib marrow is performed with morphological closing of a binary mask representing the rib cortical bone. Closing of the mask encloses the bone marrow. Subtraction of the original mask from the closed mask leaves the marrow. The above is repeated for three different cortical bone thresholds, for example 200 HU, 250 HU, and 300 HU, to account for intra-patient variability and inter-patient variability of rib bone density. In such an embodiment, the union of the three marrow masks is outputted, as shown at 601.

Optionally, morphological operations are used for performing the segmentation, for example by excluding regions previously marked as related to the spine, the lungs, and/or the areas that encircle the body. Then, as shown at 602, voxels in an area that surrounds the rib marrow are tagged as cortical bone characteristics. Now, the cortical bone characteristics, which may be referred to herein as seeds, are dilated to create a cortical bone component. Optionally, the dilatation is performed according to a component classification algorithm followed by expansion of an object to include neighboring cortical bone characteristics in a similar manner to the described in relation to 106 and 107. Optionally, as shown at 603, a binary mask containing the cortical bone is created by thresholding the medical image with an intensity threshold of 200 HU. As shown at 604, the bone marrow is segmented in 601 and the mask obtained in 603 is superimposed onto to a binary mask that bounds the expansion of the rib component in 605.

As shown at 605, the potential cortical bone seeds are dilated 610, optionally one by one, to create potential ribs components. The dilation of each cortical bone seed is repeated in a plurality of dilation iterations that lasts as long as the dilated component is classified 611. Optionally, the dilated component may be classified according to one or more of the following:
1. Ball-shaped components are classified as non-ribs components 613, for example using PCA.
2. If the cortical bone seed expands beyond a predefined distance from the potential component's center without being tagged as either rib or non-rib, it is classified as a non rib object 613.
3. Then, thin, straight, tubular components with approximately predefined orientation relative to the axes of the body are classified as potential rib components 612, optionally using PCA.

Optionally, the classification as a potential rib component 612 further includes analyzing the intensity radiodensity variance of voxels in the neighborhood of the dilated seed. A potential rib component's intensity radiodensity variance is optionally defined as a high intensity radiodensity variance that corresponds to a mix of low-density marrow and high-density cortical-bone voxels. Such a classification allows distinguishing the ribs from blood vessels.

Now, as shown at 606 and 607, each potential rib component is expanded as a seed in a balloon expansion algorithm that is optionally similar to the balloon expansion algorithm described in relation to FIG. 3 above. For brevity, the description of the dilation is not repeated herein. Optionally, the local cost of each voxel is calculated as according to a union of voxels, not included in the perimeter of the previously-segmented spine and/or previously calculated dilated components, having an HU value above a cortical-bone threshold (200 HU). For all other voxels the local cost is prohibitively high, for example effectively infinite. Optionally, seeds and potential components which are not classified as potential rib components are removed. Such an expansion evaluation is used for classifying the current front as rib-like component front which is based on PCA-derived criteria. Optionally, an additional criterion that considers the number of voxels within each thin shell of the growing component is used. Such a criterion may be used for detecting curved regions having a PCA statistics which may not be tubular and elongated and therefore may not be detected by the previous criterion. If the number of voxels per shell remains stable enough to exclude a leak the front is classified as rib-like.

Optionally, a computing unit with a plurality of central processing units (CPUs) is used for implementing the ribs segmentation depicted in FIG. 6 In such an embodiment 602-606 may be performed in parallel, respectively on a binary mask encircling the left and right sides of the ribcage. The binary masks may be separated according to the body symmetry plane which is computed and stored in the skeletal atlas, for example as described in the co-filed application.

Now, as shown at 608, vessels, such as abdominal vessels, are removed from the wraparound of the potential ribs components. Optionally, the potential rib components are compared to an extended region around the ribs in the skeletal atlas. The extended region is optionally marked manually in the atlas and then transformed onto the study, for example as described in the co-filed application. Optionally, the comparison is based on an atlas ribcage transformation. If the registered expanded atlas ribcage is superimposed with an overlap of approximately 75% overlap or more onto the segmented ribcage, which is an indication of a relatively good registration, potential rib components which according to the comparison have not been successfully registered are deleted from the rib mask. In such a manner, abdominal vessels which have been misclassified as ribs are deleted.

Now, as shown at 609, the potential rib components are used for creating a mask that is outputted to allow segmenting the ribs.

Figure 7:
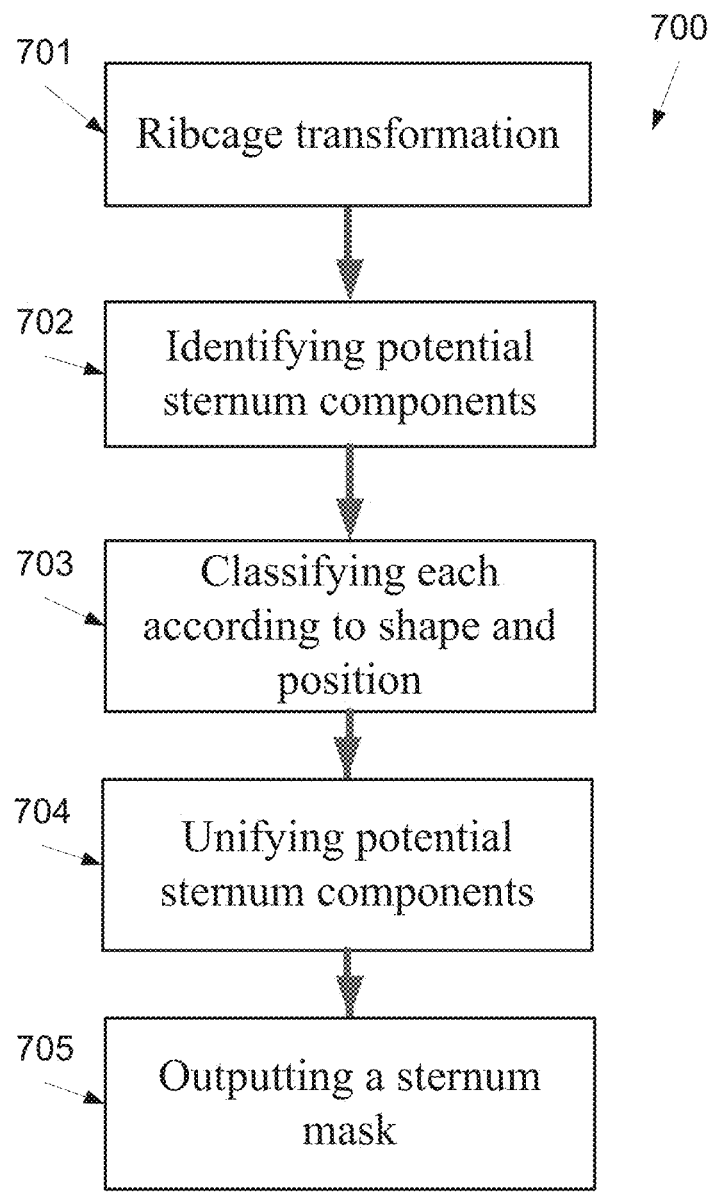
FIG. 7 is a flowchart of a method for segmenting the sternum according to a skeletal atlas, according to some embodiments of the present invention.

Reference is now made once again to FIG. 1. As shown at 105, the medical image is segmented according to the atlas. As shown at 110, the sternum is segmented. Reference is also made to FIG. 7, which is a flowchart of a method 700 for segmenting the sternum according to a skeletal atlas, according to some embodiments of the present invention.

First, as shown at 701, a sternum ROI is transformed according to a ribcage transformation between the medical image and the skeletal atlas. Optionally, the ROI includes a shell around the sternum to account for mis-registration. The sternum ROI contains several sternum components, calcified cartilage of the ribs' ends, and possibly segments of the heart.

Now, as shown at 702, sternum components are classified as potential sternum components. As shown at 703, each one of the components is classified according to one or more of the following:
1. The estimated position of a potential sternum component is after a layer of air and before the lungs. Optionally, the estimated position of the lung is based on the pre-processing of the medical image and/or or on the registration according to the skeletal atlas, for example as described in the co-filed application.
2. The estimated shape of a sternum component is a vertical, flat oval cylinder. Optionally, suitability of the shape of the potential sternum components is classified according to the accordance thereof with the estimated sternum shape, for example using PCA.

Now, as shown at 704, a union of the potential sternum components is tagged as the sternum mask. As shown at 705, the sternum mask is outputted to allow the segmentation of the sternum from the medical image.

Figure 8:
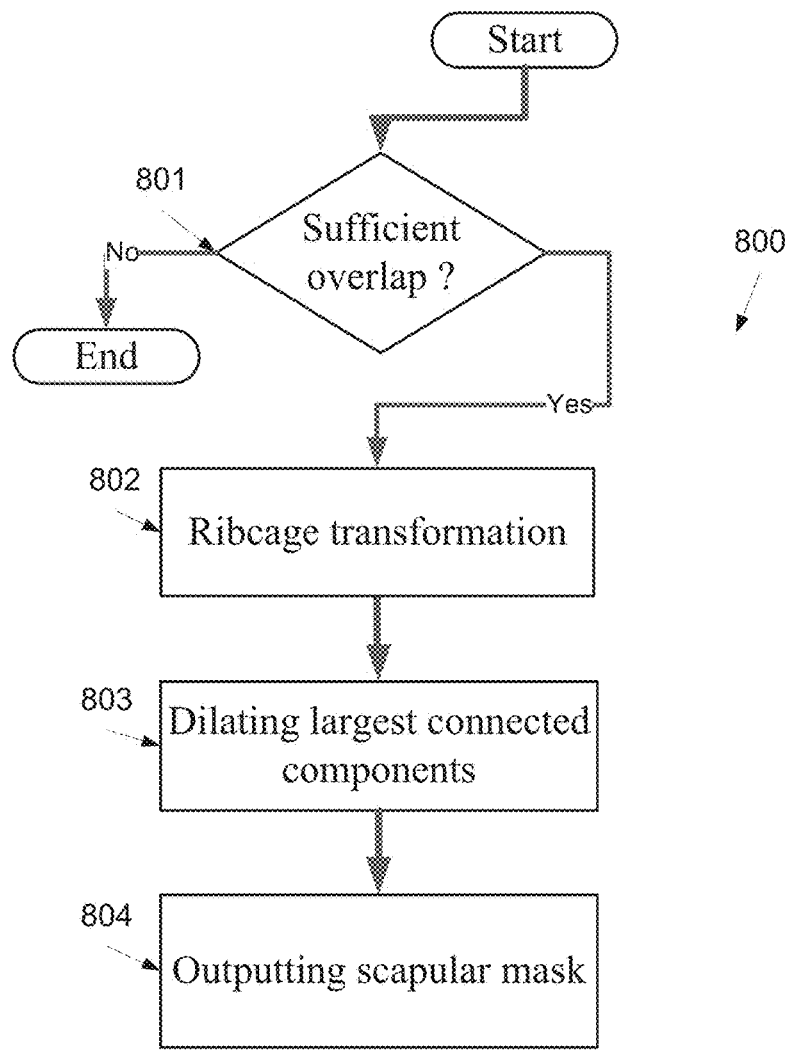
FIG. 8, which is a flowchart of a method for segmenting the scapulae according to a skeletal atlas, according to some embodiments of the present invention.

Reference is now made once again to FIG. 1. As shown at 105, the medical image is segmented according to the atlas. As shown at 111, the scapulae are segmented. Reference is also made to FIG. 8, which is a flowchart of a method 800 for segmenting the scapulae according to a skeletal atlas, according to some embodiments of the present invention.

As shown at 801, the scapulae are segmented if sufficient overlap, for example 75% or more, is found between the segmented ribs and a transformed expanded region that surrounds the ribcage in the skeletal atlas. Optionally, this region is segmented manually around the ribs during the preparation of the atlas.

As shown at 802, a scapulae ROI is transformed using the aforementioned ribcage transformation. The scapulae ROI is an expanded region around the scapulae, segmented manually in the atlas. The mapping of the ROI produces two regions of interest containing the scapulae which are depicted in the medical image.

Then, as shown at 803, the largest two connected components within the scapulae ROI are dilated by applying a morphological filter, such as connectivity-dilation filter, for example as described in relation to numeral 204 of FIG. 2. In such a manner, small errors in the registration are corrected.

Now, as shown at 804, a scapular mask, which is based on the scapulae ROI, is outputted to allow the segmentation of the scapulae from the medical image.

Reference is now made once again to FIG. 1. After the legs and feet, the spine, the pelvis, the ribs, the sternum, and/or the scapulae have been segmented, a bone mask which is based on the registration of the medical image onto the atlas is provided. Optionally, the head, neck and/or the upper limb bones are separately segmented. This mask may be used for segmenting the provided medical image. The removal of bone segments from the medical image, for example for providing a computer visualization of the organs depicted in the medical images, allows practitioners, such as radiologists, to better diagnose different pathologies.

The bone mask may be used for the display of blood vessels from images obtained with other 3D angiographic imaging techniques, such as maximum intensity projection (MIP). In such an embodiment, bones may be segmented to improve the display of blood vessels. For clarity, the removal of high-density, bony barriers from medical images, such as 3D CT angiography images, reveals blood vessels that are otherwise hidden in traditional imaging views, for example the arteries below the knee on runoff CT angiography (CTA) medical images. In such a manner, precise data that allows a less-invasive clinical procedures and increased diagnostic confidence is provided.

Such segmentations may allow a visualization of bones which are located in a proximity to the vascular tree and depicted in a medical image, such as a CTA medical image, as semi-transparent object. In such a manner, pathologies and their relations to skeletal landmarks may be emphasized for surgical treatment planning procedures. Such segmentations may allow 3D rendering of a vascular tree image. The vascular tree image provides clear and informative views of pre-operative findings, such as atherosclerosis, aneurysms, dissections, and/or post-operative follow-ups on common procedures such as stent grafts. Such images may be useful for practitioners such as surgeons, referring physicians, and/or for research, education and/or documentation proposes.

Figure 9:
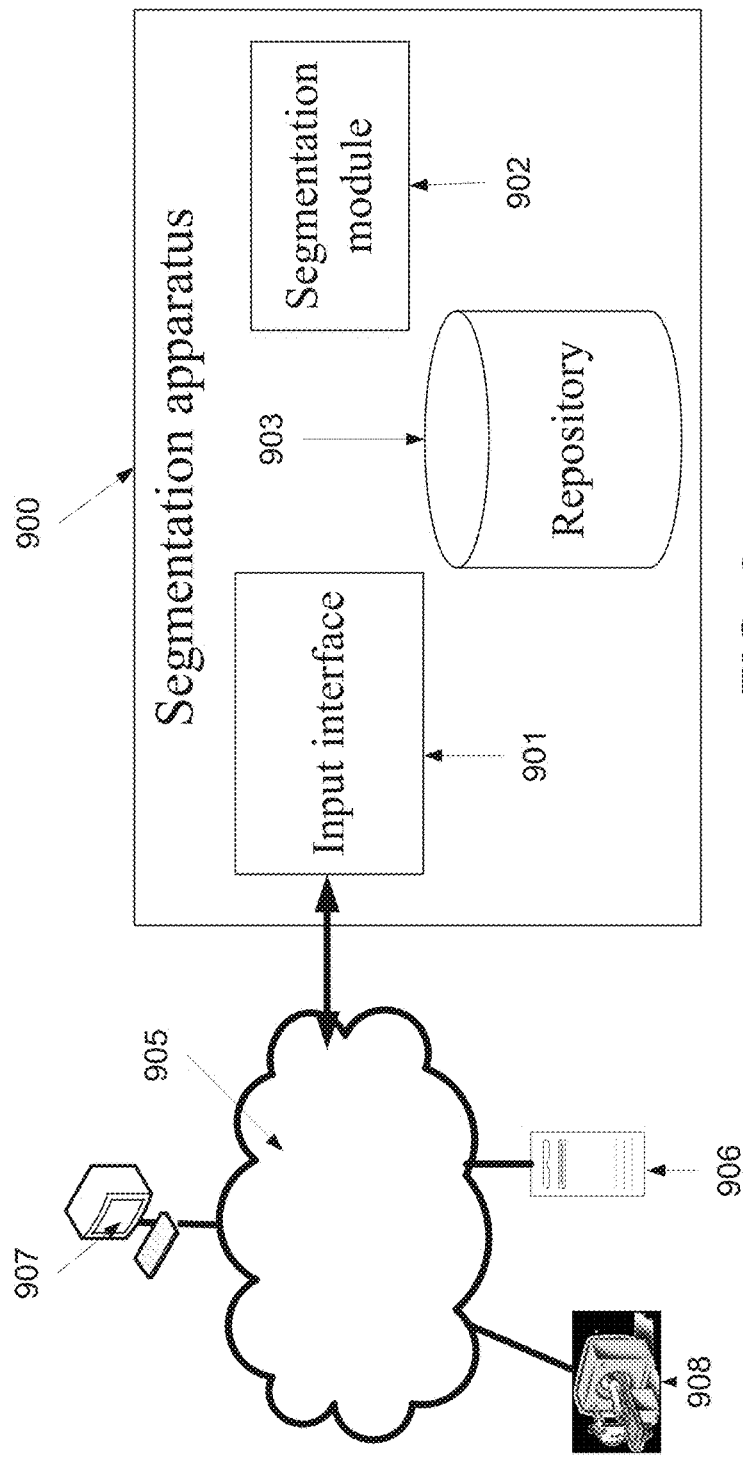
FIG. 9 is a schematic illustration of an apparatus for segmenting a medical image, according to some embodiments of the present invention.

Reference is now also made to FIG. 9, which is a schematic illustration of an apparatus 900 connected to a communication network 905, such as the internet, for segmenting bone of predefined organs, for example according to the method depicted in FIG. 1, according to some embodiments of the present invention. The apparatus 900 comprises an input interface 901 configured for receiving a medical image of a plurality of bones of a patient. The input interface 901 optionally receives the medical image from remote medical databases 906 imaging modalities 908, and/or remote client terminals 907, for example as described in Provisional U.S. Patent Applications No. 61/071,709 and Patent application No. 61/071,708 both co-filed on May 14, 2008, the contents of which are hereby incorporated by reference. The apparatus 900 further comprises a repository 903 that stores the skeletal atlases according to which the medical image is registered, for example as described in the co filed application. The apparatus 900 further comprises a segmentation module 902 for segmenting some or all of the bones in the medical image according to respective exemplary bones which are mapped in the skeletal atlas, for example as described above in relation to FIG. 1. Optionally, the segmentation described hereinabove may be used for segmenting medical images in a medical database 906, such as the PACS. Such an application may be activated automatically and/or according to user inputs, for example using a graphical user interface (GUI), for example as described in the co filed application.

It is expected that during the life of a patent maturing from this application many relevant systems and methods will be developed and the scope of the terms medical image and imaging is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for segmenting a predefined organ, having one or more predefined anatomical characteristics, in a medical image, the method comprising:

providing a skeletal atlas depicting an exemplary skeletal structure having a plurality of exemplary bones identified in the atlas, one or more of which pertain to the predefined organ;

providing a registration of the medical image depicting a plurality of bones to the skeletal atlas, the registration producing a mapping between the bones depicted in the skeletal atlas and the bones depicted in the medical image;

identifying, in the medical image, at least one of the bones that pertain to the predefined organ, using the mapping between the medical image and the atlas, and the identification of that bone in the atlas;

identifying, automatically using a data processor, at least one component of the predefined organ in the medical image, based on the component's proximity to the identified bone in the medical image, and on the component having at least one of the predefined anatomical characteristics indicative of the predefined organ;

selecting one or more criteria for expanding the component into neighboring voxels based on at least one of the known anatomical characteristics; and segmenting at least one region of interest (ROI) around said at least one component within said medical image by expanding the component using said one or more criteria;

wherein the method of segmenting is performed by one or more computing units, including at least the data processor used for automatically identifying the at least one component of the predefined organ.

2. The method of claim 1, wherein said predefined organ is selected from a group consisting of a lower limb, sternum, the pelvis, the spine, the scapulae, and the ribs.

3. The method of claim 1, wherein said registration is used to transform said predefined organ including its component having said at least one anatomical characteristic into said ROI.

4. The method of claim 1, further comprising filling surface discontinuities in said ROI.

5. The method of claim 1, further comprising dilating said at least one component according to at least one anatomical characteristic of neighboring voxels in said medical image and classifying said at least one dilated component, said dilating continuing according to said classification.

6. The method of claim 5, wherein said classifying is performed according to at least one of the shape of said at least one dilated component and the radiodensity variance of said at least one dilated component.

7. The method of claim 1, further comprising classifying at least one vascular sub component in said at least one component as at least one vessel before said segmenting, said segmenting comprising removing said at least one vascular sub component from said at least one component.

8. The method of claim 7, further comprising dilating at least one sub component in said at least one component.

9. The method of claim 8, wherein said classifying is performed according to the radiodensity variance of said at least one dilated sub component.

10. The method of claim 7, further comprising dilating said at least one sub component by a marching process and classifying said at least one dilated sub component according to a shape of a wave front of said at least one dilated sub component, said dilating continuing according to said classification.

11. The method of claim 1, wherein at least one voxel of at least one sub component of said component is tagged within said ROI according to an intensity pertaining thereto, said segmenting being performed according to said tagging.

12. The method of claim 10, wherein said dilating is performed in an iterative boundary expansion process, the direction of said dilating continuing according to the shape of said at least one dilated component during said iterative boundary expansion process.

13. The method of claim 1, wherein said predefined organ is the spine, said identifying comprises classification of a voxel as either vertebrae or aorta according to at least one member of the following group: a mean voxel intensity value, a voxel intensity radiodensity variance, a gradient magnitude, a second derivative of the radiodensity, a box interior mean, a box interior radiodensity variance, a box boundary mean, and a box boundary radiodensity variance.

14. The method of claim 1, wherein at least one voxel of said at least one component is tagged by identifying a first sub component having at least one characteristic indicative of a bone marrow in said medical image and a second sub component encircling said first sub component and removing said first sub component, and said segmenting being performed according to said tagging.

15. The method of claim 1, wherein said predefined organ is the sternum, said at least one anatomical characteristic being at least one of the estimated location of the lungs and a layer of air in front of the said at least one component.

16. The method of claim 1, wherein said medical image data comprises a member of a group consisting of a computed tomography (CT) medical image, a positron emission tomography (PET), a magnetic resonance imaging (MRI), a PET-CT image, and a single photon emission computed tomography (SPECT) image.

17. An apparatus for segmenting a predefined organ, having one or more predefined anatomical characteristics, in a medical image, comprising:
a memory or data storage device with data of a skeletal atlas depicting an exemplary skeletal structure having a plurality of exemplary bones identified in the atlas, one or more of which pertain to the predefined organ;
an input interface configured for receiving a medical image depicting a plurality of bones;
a data processor that executes instructions;
a registration module, executed by the data processor, configured for providing a registration of said medical image to the skeletal atlas, the registration producing a mapping between the bones depicted in the skeletal atlas and the bones depicted in the medical image; and
a segmentation module, executed by the data processor, configured for:
identifying, in the medical image, at least one of the bones that pertain to the predefined organ, using the mapping between the medical image and the atlas, and the identification of that bone in the atlas;
identifying at least one component of the predefined organ in the medical image based on the component's proximity to the identified bone in the medical image, and on the component having at least one of the predefined anatomical characteristics indicative of the organ;
selecting one or more criteria for expanding the component into neighboring voxels, based on at least one of the known anatomical characteristic; and
segmenting at least one region of interest (ROI) around said at least one component by expanding the component according to the one or more criteria.

18. The apparatus of claim 17, wherein said apparatus is a picture archiving and communication system (PACS) workstation.

19. The apparatus of claim 17, wherein the output of said segmentation module is used to visualize said medical image with bones of at least one of variable opacity and color.

20. The method of claim 1, wherein the one or more bones pertain to the predefined organ by being in proximity to at least a component of the predefined organ.

21. The method of claim 1, wherein the one or more bones pertain to the predefined organ by being adjacent or relatively close to at least a component of the predefined organ.

22. The method of claim 1, wherein the one or more bones pertain to the predefined organ by at least a component of the predefined organ being in a predefined location in relation to the one or more bones.

23. The method according to claim 1, wherein the predefined organ comprises an organ other than a bone.

24. The method of claim 23, wherein the predefined organ comprises a blood vessel.

25. The method of claim 23, wherein the predefined organ comprises a lung.

26. The method of claim 1, also for segmenting one or more additional predefined organs each having one or more predefined anatomical characteristics, in the medical image, the method comprising:
identifying, in the medical image, one or more other bones, each of which pertains to at least one of the one or more other predefined organs, using the mapping between the medical image and the atlas, and the identification of that bone in the atlas;
for each of the other predefined organs, identifying, automatically using the data processor, at least one component of said predefined organ in the medical image, based on the component's proximity in the medical image to the identified bone that pertains to that predefined organ;
for each of the other predefined organs, selecting one or more criteria for expanding the component of said predefined organ based on at least one of the known anatomical characteristics of said predefined organ; and
for each of the other predefined organs, segmenting at least one region of interest around the at least one component for said predefined organ within the medical image, by expanding that component using the one or more criteria for said predefined organ.

27. The method of claim 1, wherein segmenting at least one region of interest is done by the one or more computing units fully automatically.

* * * * *